(12) United States Patent
Hwang et al.

(10) Patent No.: US 8,492,047 B2
(45) Date of Patent: Jul. 23, 2013

(54) HYDROGEN SUPPLY SYSTEM FOR FUEL CELL AND METHOD FOR CONTROLLING THE SAME

(75) Inventors: Ki Ho Hwang, Gyeonggi-Do (KR); Sang Hyun Kim, Gyeonggi-Do (KR); Young Min Choi, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 297 days.

(21) Appl. No.: 12/797,230

(22) Filed: Jun. 9, 2010

(65) Prior Publication Data
US 2010/0248063 A1 Sep. 30, 2010

Related U.S. Application Data

(62) Division of application No. 12/268,162, filed on Nov. 10, 2008, now abandoned.

(30) Foreign Application Priority Data

Apr. 28, 2008 (KR) .......................... 10-2008-0039149

(51) Int. Cl.
*H01M 8/04* (2006.01)
*B65B 31/00* (2006.01)
(52) U.S. Cl.
USPC .............................................. 429/444; 141/4

(58) Field of Classification Search
USPC ............................................... 429/444; 141/4
See application file for complete search history.

(56) References Cited

U.S. PATENT DOCUMENTS

2005/0003246 A1 * 1/2005 Shimada et al. ................ 429/17

FOREIGN PATENT DOCUMENTS

| JP | 2001-336450 | | 12/2001 |
|---|---|---|---|
| JP | 2003-090499 | | 3/2003 |
| KR | 2004-0003575 | | 1/2004 |
| KR | 20040003575 | * | 1/2004 |
| KR | 10-0805445 | | 2/2008 |

* cited by examiner

*Primary Examiner* — Karie O'Neill Apicella
(74) *Attorney, Agent, or Firm* — Edwards Wildman Palmer LLP; Peter F. Corless

(57) ABSTRACT

The present invention provides a method for controlling a hydrogen supply system for a fuel cell, the method comprising: a hydrogen filling step in which high pressure hydrogen is supplied to a high pressure line connecting first to Nth hydrogen tanks to be filled in the first to Nth hydrogen tanks; a hydrogen supply step in which only hydrogen in the first hydrogen tank provided adjacent to a fuel cell stack is supplied to the fuel cell stack during driving of a vehicle; and a hydrogen transfer step in which hydrogen is transferred from the second to Nth hydrogen tanks to the first hydrogen tank during parking or stopping of the vehicle.

4 Claims, 4 Drawing Sheets

– DURING HYDROGEN FILLING –

HYDROGEN SUPPLY SYSTEM FOR FUEL CELL AND METHOD FOR CONTROLLING THE SAME

CROSS-REFERENCE TO RELATED APPLICATION

This application is a divisional of U.S. application Ser. No. 12/268,162, filed on Nov. 10, 2008, which claims under 35 U.S.C. §119(a) the benefit of Korean Patent Application No. 10-2008-0039149 filed Apr. 28, 2008, the entire contents of which are incorporated herein by reference.

BACKGROUND (a) Technical Field

The present invention relates to a hydrogen supply system for a fuel cell and a method for controlling the same. More particularly, the present invention relates to a hydrogen supply system including a plurality of hydrogen tanks, in which an in-tank regulator is mounted on one hydrogen tank and a solenoid valve is mounted on each of the other hydrogen tanks so as to stably supply hydrogen by controlling the solenoid valves during driving, and a method for controlling the same.

(b) Background Art

Generally, a fuel cell system includes a fuel cell stack for generating electrical energy, a fuel (hydrogen) supply system for supplying fuel (hydrogen) to the fuel cell stack, an air supply system for providing oxygen in the air to the fuel cell stack, the oxygen in the air being an oxidizer required for an electrochemical reaction, and a thermal management system for controlling the operating temperature of the fuel cell stack.

Hydrogen compressed to a high pressure of about 350 bar is stored in a hydrogen tank in the fuel supply system. The stored compressed hydrogen is discharged to a high pressure line according to an on/off of a solenoid valve preferably provided at an inlet portion of the hydrogen tank and then supplied to the fuel cell stack after the pressure of the compressed hydrogen is reduced from 350 bar to 10 bar by an external regulator.

Preferably, as a method of storing hydrogen in the hydrogen tank of the fuel cell system, a high pressure compression (350 bar or 700 bar compression) method is generally adopted. Accordingly, a high pressure of 350 bar or 700 bar is always applied to the high pressure line connected to the solenoid valve by the use of the external regulator, thus affecting the durability of the portions to which the high pressure is continuously being applied.

Given the above circumstances, when an in-tank regulator is used instead of the external regulator, it is possible to ensure safety during operation of the system by eliminating the high pressure line, and further it is possible to simplify the system and reduce manufacturing cost.

The in-tank regulator is effective for a single tank system; however, in the case of a multiple tank system including a plurality of tanks, the manufacturing cost of the in-tank regulator is increased since it should be provided at each of the plurality of tanks.

Accordingly, a large-scale single tank system is employed; however, it is necessary to optimally design a space for mounting the large-scale single tank in the vehicle body and chassis, and it is difficult to pack the single tank with peripheral components due to the large volume.

Accordingly, the multiple tank system, in which a plurality of small-scale tanks is mounted, provides a degree of freedom for the vehicle body and chassis design and can be packaged with the peripheral components, as compared with the single tank system. Further, the multiple tank system has a reduced manufacturing cost.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides a hydrogen supply system including a plurality of hydrogen tanks, in which an in-tank regulator is preferably mounted only on one hydrogen tank and a solenoid valve is preferably mounted on each of the other hydrogen tanks so that a reduction in manufacturing cost is suitably realized and preferably hydrogen is stably supplied to a fuel cell stack by preferably controlling the solenoid valves during driving, and a method for controlling the same.

In one embodiment, the present invention provides a hydrogen supply system for a fuel cell, the system preferably comprising a plurality of hydrogen tanks, wherein an in-tank regulator is suitably mounted only at an inlet portion of a first hydrogen tank of the plurality of hydrogen tanks and a solenoid valve is preferably mounted at an inlet portion of each of the other hydrogen tanks.

In another embodiment, the present invention provides a method for controlling a hydrogen supply system for a fuel cell, the system preferably including a plurality of hydrogen tanks, and the method comprising: a hydrogen filling step in which high pressure hydrogen is preferably supplied to a high pressure line suitably connecting first to Nth hydrogen tanks to be filled in the first to Nth hydrogen tanks; a hydrogen supply step in which only hydrogen in the first hydrogen tank provided adjacent to a fuel cell stack is preferably supplied to the fuel cell stack during driving of a vehicle; and a hydrogen transfer step in which hydrogen is suitably transferred from the second to Nth hydrogen tanks to the first hydrogen tank during parking or stopping of the vehicle.

In a preferred embodiment, in the hydrogen filling step, a solenoid valve of an in-tank regulator suitably mounted at an inlet portion of the first hydrogen tank and a solenoid valve suitably mounted at an inlet portion of each of the second to Nth hydrogen tanks are all suitably opened by the pressure of high pressure hydrogen so that the high pressure hydrogen is suitably filled in the respective hydrogen tanks.

In another preferred embodiment, in the hydrogen supply step, the solenoid valve of the in-tank regulator suitably mounted at the inlet portion of the first hydrogen tank is preferably controlled to be opened and the solenoid valve suitably mounted at the inlet portion of each of the second to Nth hydrogen tanks is preferably controlled to be suitably closed so that only the hydrogen in the first hydrogen tank is supplied to the fuel cell stack.

In still another preferred embodiment, in the hydrogen transfer step, the solenoid valve of the in-tank regulator suitably mounted at the inlet portion of the first hydrogen tank is preferably controlled to be suitably closed and the solenoid valve suitably mounted at the inlet portion of each of the second to Nth hydrogen tanks is preferably controlled to be suitably opened so that the hydrogen in the second to Nth hydrogen tanks is transferred and filled in the first hydrogen tank.

In yet another preferred embodiment, when the pressure of the first to Nth hydrogen tanks is suitably reduced to a minimum operating pressure, the solenoid valve of the in-tank regulator of the first hydrogen tank and the solenoid valves of the second to Nth hydrogen tanks are preferably controlled to be all opened so that residual hydrogen in the respective hydrogen tanks is used.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
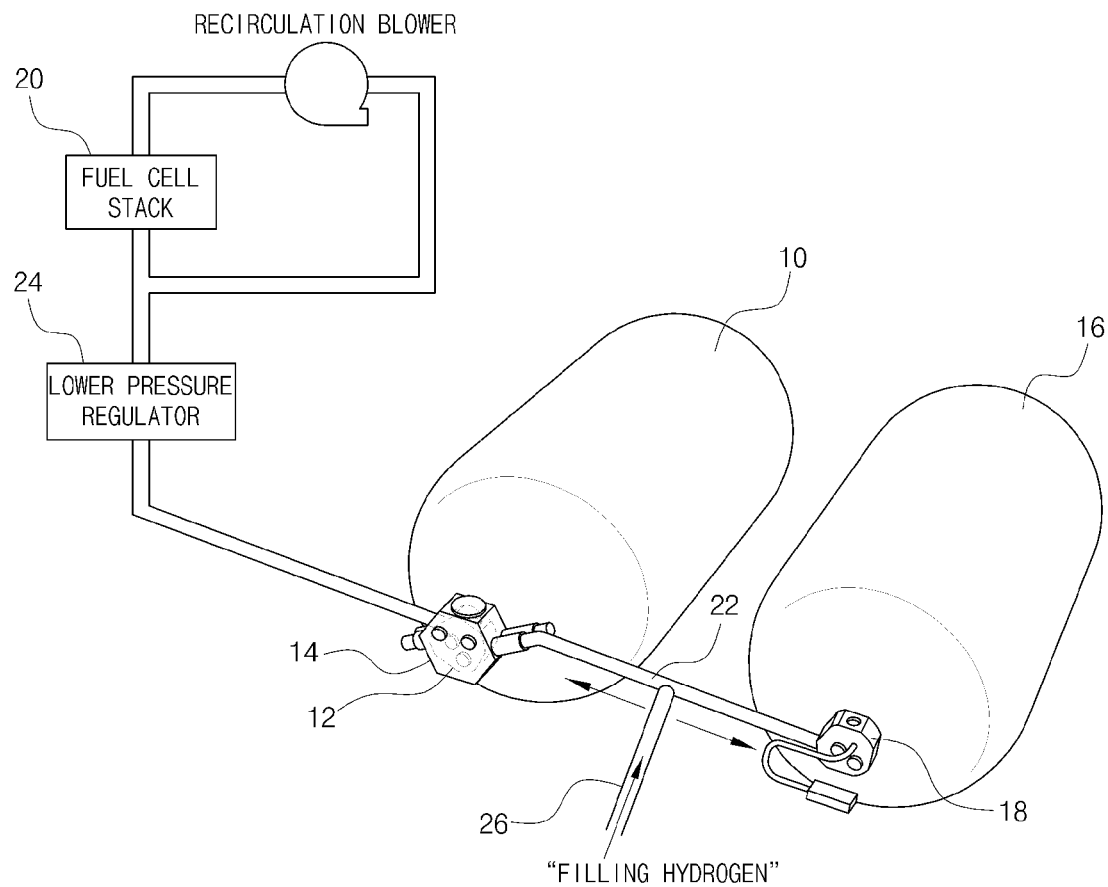
FIG. 1 is a schematic diagram illustrating a hydrogen filling process in a hydrogen supply system for a fuel cell in accordance with the present invention.

Reference numerals set forth in the Drawings includes reference to the following elements as further discussed below:

| | |
|---|---|
| 10: first hydrogen tank | 12: first solenoid valve |
| 14: in-tank regulator | 16: second hydrogen tank |
| 18: second solenoid valve | 20: fuel cell stack |
| 22: high pressure line | 24: low pressure regulator |
| 26: filling line | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a hydrogen supply system for a fuel cell, the system comprising a plurality of hydrogen tanks, an intake regulator and a solenoid valve. In certain embodiments, the in-tank regulator is mounted at an inlet portion of a first hydrogen tank of the plurality of hydrogen tanks and the solenoid valve is mounted at an inlet portion of each of the other hydrogen tanks.

The present invention also features a method for controlling a hydrogen supply system for a fuel cell, the system including a plurality of hydrogen tanks, the method comprising: a hydrogen filling step; a hydrogen supply step; and a hydrogen transfer step.

In certain embodiments, the hydrogen filling step comprises high pressure hydrogen being supplied to a high pressure line connecting first to Nth hydrogen tanks to be filled in the first to Nth hydrogen tanks. In other embodiments, in the hydrogen supply step only hydrogen in the first hydrogen tank provided adjacent to a fuel cell stack is supplied to the fuel cell stack during driving of a vehicle.

In further embodiments of the invention, the hydrogen transfer step comprises hydrogen being transferred from the second to Nth hydrogen tanks to the first hydrogen tank during parking or stopping of the vehicle.

The invention can also include a motor vehicle comprising the hydrogen supply system as described in any one of the above aspects.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a hydrogen supply system preferably including a plurality of hydrogen tanks, i.e., a multiple hydrogen tank system. In certain preferred embodiments, an in-tank regulator is suitably mounted only on one hydrogen tank adjacent to a fuel cell stack and a solenoid valve is suitably mounted on each of the other hydrogen tanks. As a result, in certain embodiments, since the in-tank regulator is preferably mounted only on one hydrogen tank, it is possible to considerably reduce manufacturing cost, compared with the conventional multiple hydrogen tank system in which the in-tank regulator is preferably provided at each of the plurality of hydrogen tanks, which results in an increase in manufacturing cost.

For a better understanding of the present invention, the plurality of hydrogen tanks, i.e., first to Nth hydrogen tanks, in certain exemplary embodiments, will be suitably limited to two hydrogen tanks, in which the hydrogen tank adjacent to the fuel cell stack will be preferably referred to as the first hydrogen tank, and the hydrogen tank suitably connected to the first hydrogen tank through a high pressure line will be preferably referred to as the second hydrogen tank.

In certain exemplary embodiments, and as shown in FIGS. 1 to 4, an in-tank regulator 14 having a first solenoid valve 12 is preferably mounted at an inlet portion of a first hydrogen tank 10 adjacent to a fuel cell stack 20, and a second solenoid valve 18 is preferably mounted at an inlet portion of a second hydrogen tank 16.

Accordingly, the inlet portions of the first hydrogen tank 10 and the second hydrogen tank 16 are suitably connected to each other through the high pressure line 22. In certain embodiments, the in-tank regulator 14 and the second solenoid valve 18 are preferably connected to each other through the high pressure line 22.

In further embodiments, an outlet portion of the in-tank regulator 14 is suitably connected to a fuel electrode of the fuel cell stack 20 preferably through another low pressure regulator 24.

In other embodiments, the in-tank regulator 14 is preferably mounted only on the first hydrogen tank 10 adjacent to the fuel cell stack 20 among the plurality of hydrogen tanks, and it is necessary to suitably employ a new control method for supplying hydrogen.

According to preferred embodiments of the present invention, the first solenoid valve 12 suitably mounted on the in-tank regulator 14 of the first hydrogen tank 10 and the second solenoid valve 18 suitably mounted on the second hydrogen tank 16 are on/off controlled during hydrogen filling, during driving of a vehicle, and during parking or stopping of a vehicle, respectively, thus stably supplying hydrogen to the fuel cell stack 20.

Next, a preferred method for controlling the hydrogen supply system for a fuel cell in accordance with certain embodiments of the present invention will be described with respect to the respective processes in detail.

Hydrogen Filling Process

FIG. 1 is a schematic diagram illustrating an exemplary hydrogen filling process in the hydrogen supply system for a fuel cell in accordance with preferred embodiments of the present invention.

As shown in exemplary FIG. 1, a filling line 26 is suitably connected to the high pressure line 22 preferably connected between the inlet portions of the first and second hydrogen tanks 10 and 16, i.e., preferably between the in-tank regulator 14 of the first hydrogen tank 10 and the second solenoid valve 18 of the second hydrogen tank 16.

According to further embodiments, when high pressure hydrogen is suitably supplied from a hydrogen storage tank of a hydrogen filling station (not shown) to the filling line 26 and the high pressure line 22, the first solenoid valve 12 mounted on the in-tank regulator 14 is preferably automatically opened by the pressure of the high pressure hydrogen, and preferably the high pressure hydrogen is suitably filled in the first hydrogen tank 10. In related embodiments, at the same time, the second solenoid valve 18 of the second hydrogen tank 16 is preferably automatically opened by the pressure of the high pressure hydrogen, and thus the high pressure hydrogen is suitably filled in the second hydrogen tank 16.

In preferred embodiments, the first and second solenoid valves 12 and 18 are preferably automatically opened by a difference in pressure without using electrical power, i.e., by the pressure of the high pressure hydrogen, and thus the first and second hydrogen tanks 10 and 16 are suitably filled with the high pressure hydrogen.

Hydrogen Supply Process

In preferred embodiments, the term he "hydrogen supply process" is meant to refer to a process in which hydrogen is supplied to the fuel cell stack during driving of a vehicle.

Figure 2:
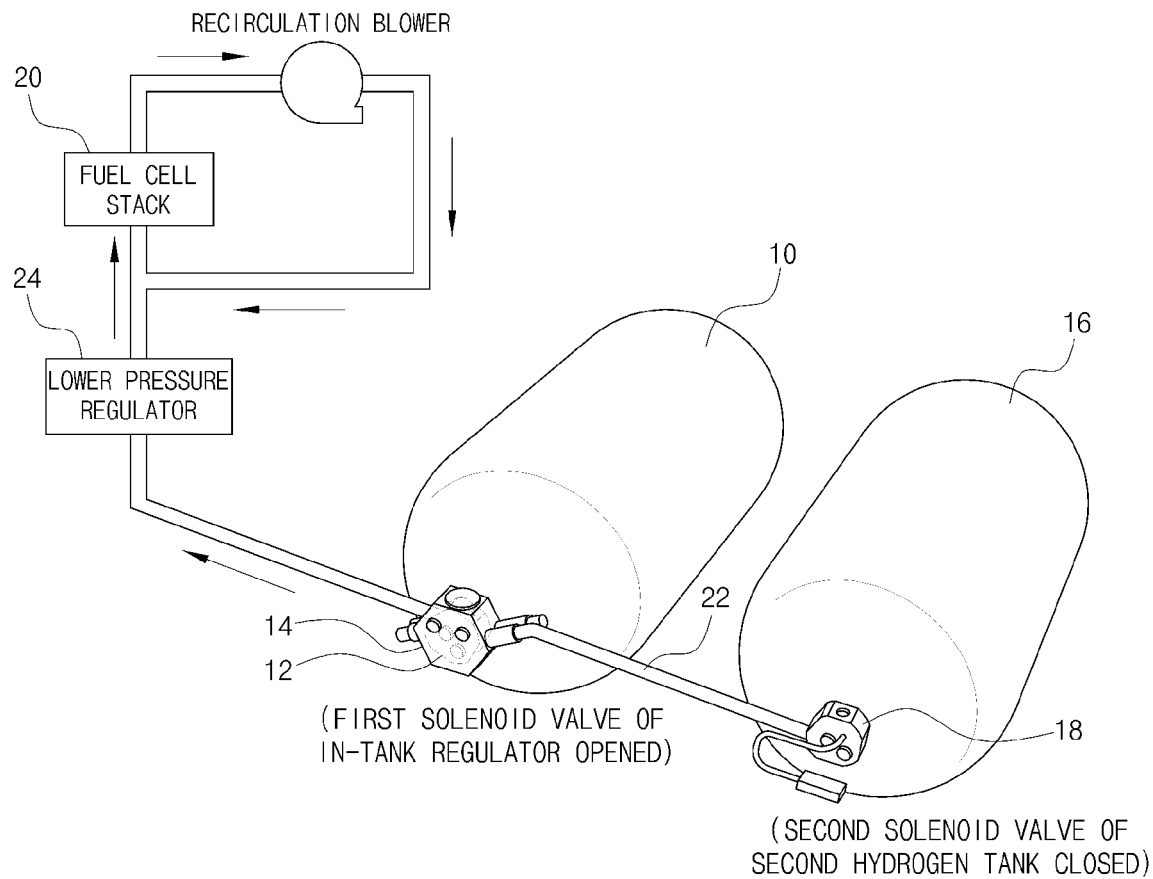
FIG. 2 is a schematic diagram illustrating a hydrogen supply process in the hydrogen supply system for a fuel cell in accordance with the present invention.

FIG. 2 is a schematic diagram illustrating an exemplary hydrogen supply process in the hydrogen supply system for a fuel cell in accordance with the present invention.

As described herein, when the vehicle is driven in a state where the high pressure hydrogen is preferably filled in the first and second hydrogen tanks 10 and 16, the first solenoid valve 12 mounted on the in-tank regulator 14 is suitably controlled to be opened and, at the same time, the second solenoid valve 18 is suitably controlled to be closed.

According to further embodiments, only the high pressure hydrogen in the first hydrogen tank 10 is preferably supplied to the fuel electrode of the fuel cell stack 20 after the pressure of the high pressure hydrogen suitably discharged from the first hydrogen tank 10 is regulated to a low pressure of about 10 bar by the in-tank regulator 14.

Hydrogen Transfer Process

In preferred embodiments, the term "hydrogen transfer process" is meant to refer to a process in which the high pressure hydrogen in the second hydrogen tank is suitably transferred and filled in the first hydrogen tank.

Figure 3:
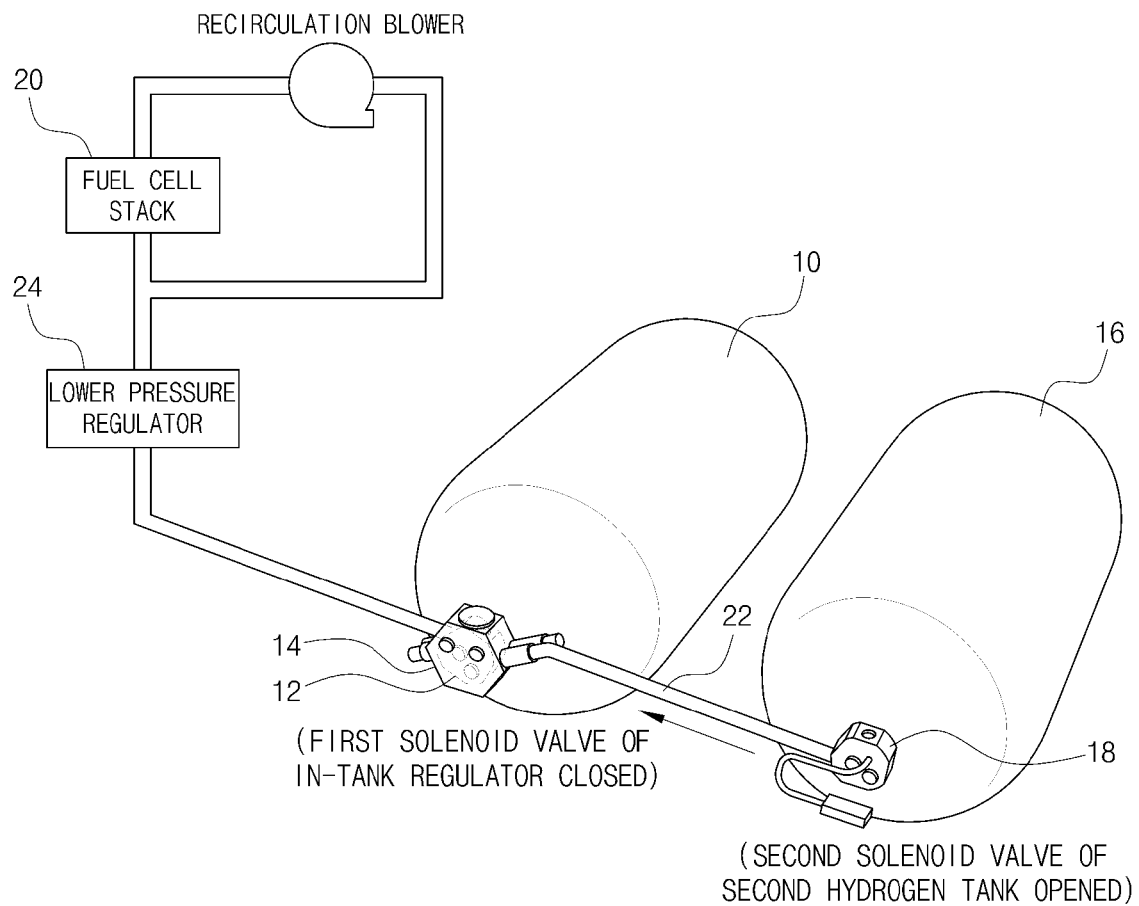
FIG. 3 is a schematic diagram illustrating a hydrogen transfer process in the hydrogen supply system for a fuel cell in accordance with the present invention.
Figure 4:
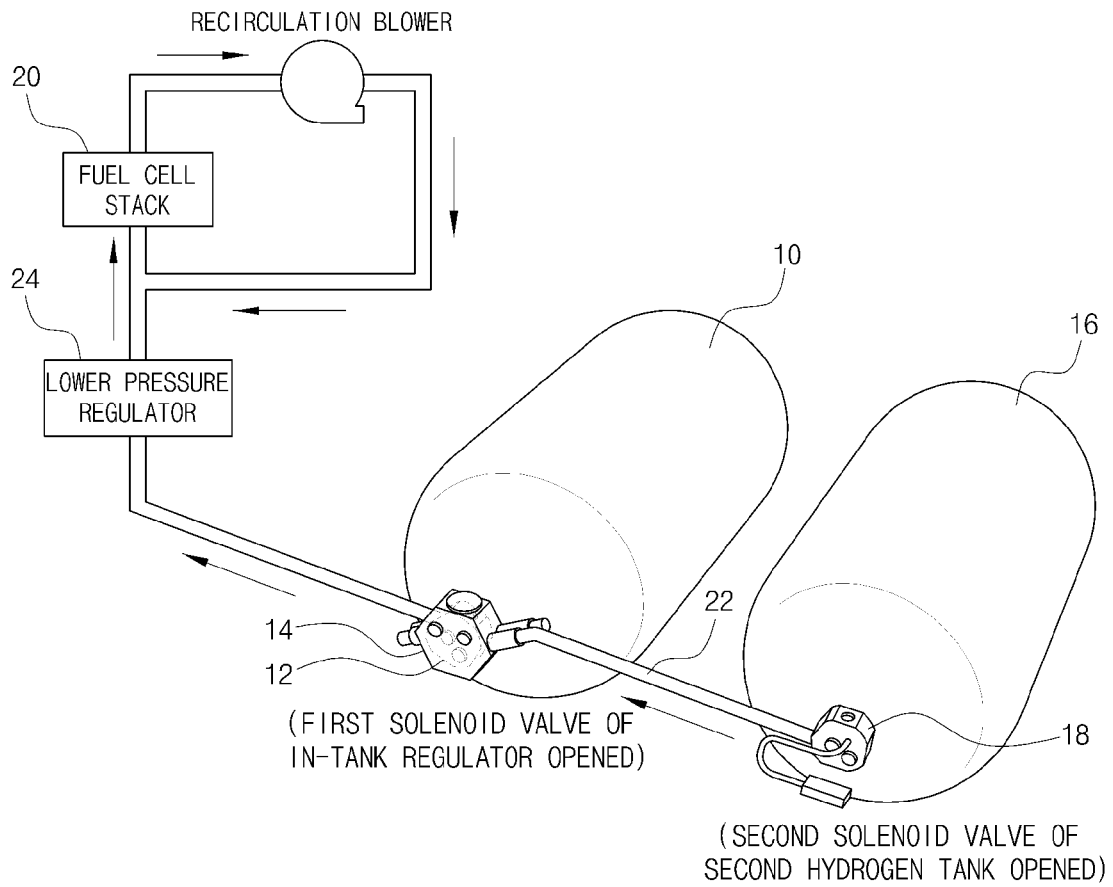
FIG. 4 is a schematic diagram illustrating the use of residual hydrogen when the pressure of respective hydrogen tanks is reduced to a low pressure in the hydrogen supply system for a fuel cell in accordance with the present invention.

FIG. 3 is a schematic diagram illustrating an exemplary hydrogen transfer process in the hydrogen supply system for a fuel cell in accordance with preferred embodiments of the present invention.

As described herein, since only the hydrogen in the first hydrogen tank 10 is preferably supplied to the fuel cell stack 20 during driving of the vehicle, the amount of hydrogen becomes suitably reduced and, accordingly, the hydrogen in the second hydrogen tank 16 is suitably refilled in the first hydrogen tank 10 during parking, stopping, or driving low speed of the vehicle.

According to further preferred embodiments, the first solenoid valve 12 of the in-tank regulator 14 mounted at the inlet portion of the first hydrogen tank 10 is preferably controlled to be closed and the second solenoid valve 18 mounted at the inlet portion of the second hydrogen tank 16 are preferably controlled to be opened so that the high pressure hydrogen in the second hydrogen tank 16 is suitably transferred through the high pressure line 22 and filled in the first hydrogen tank 10. In this case, the filling process continues until the pressures of the first and second hydrogen tanks 10 and 16 become suitably equal to each other.

Accordingly, in further embodiments, as the hydrogen filling process, the hydrogen supply process, and the hydrogen transfer process are repeatedly performed, the pressures of the first and second hydrogen tanks 10 and 16 are reduced to a low pressure, i.e., a minimum operating pressure.

Preferably, when the pressures of the first and second hydrogen tanks 10 and 16 is suitably reduced to the minimum operating pressure (about 10 bar), the first solenoid valve 12 of the in-tank regulator 14 of the first hydrogen tank 10 and the second solenoid valve 18 of the second hydrogen tank 16 are suitably controlled to be all opened so that preferably the residual hydrogen in the first and second hydrogen tanks 10 and 16 are used.

As described above, in certain preferred embodiments, the present invention provides the following effects.

According to preferred embodiments of the invention, the in-tank regulator is preferably mounted only on one hydrogen tank adjacent to the fuel cell stack and the solenoid valve is preferably mounted on each of the other hydrogen tanks in the hydrogen supply system including the plurality of hydrogen tanks, and thus it is possible to suitably stably supply hydrogen to the fuel cell stack by controlling on/off of the solenoid valves of the respective hydrogen tanks during driving of the vehicle.

Preferably, since the in-tank regulator is suitably applied to one hydrogen tank, it is possible to considerably reduce the manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a hydrogen supply system for a fuel cell, the system including a plurality of hydrogen tanks, and the method comprising:

a hydrogen filling step in which high pressure hydrogen is supplied to a high pressure line connecting first to Nth hydrogen tanks to be filled in the first to Nth hydrogen tanks;

a hydrogen supply step in which only hydrogen in the first hydrogen tank provided adjacent to a fuel cell stack is supplied to the fuel cell stack during driving of a vehicle; and a hydrogen transfer step in which hydrogen is transferred from the second to Nth hydrogen tanks to the first hydrogen tank during parking or stopping of the vehicle, wherein a solenoid valve of an in-tank regulator mounted at the inlet portion of the first hydrogen tank is controlled to be closed and a second solenoid valve mounted at the inlet portion of each of the second to Nth hydrogen tanks is controlled to be opened when the hydrogen in the second to Nth hydrogen tanks needs to be transferred and filled in the first hydrogen tank, and when the pressure of the first to Nth hydrogen tanks is reduced to a minimum operating pressure, the solenoid valve of the in-tank regulator of the first hydrogen tank and the solenoid valves of the second to Nth hydrogen tanks are all controlled to be opened so that residual hydrogen in the respective hydrogen tanks is used.

2. The method of claim 1, wherein, in the hydrogen filling step, the solenoid valve of an in-tank regulator mounted at an inlet portion of the first hydrogen tank and the solenoid valve mounted at an inlet portion of each of the second to Nth hydrogen tanks are all opened by the pressure of high pressure hydrogen so that the high pressure hydrogen is filled in the respective hydrogen tanks.

3. The method of claim 1, wherein, in the hydrogen supply step, the solenoid valve of the in-tank regulator mounted at the inlet portion of the first hydrogen tank is controlled to be opened and the solenoid valve at the inlet portion of each of the second to Nth hydrogen tanks is controlled to be closed so that only the hydrogen in the first hydrogen tank is supplied to the fuel cell stack.

4. The method of claim 1, wherein, in the hydrogen transfer step, the solenoid valve of the in-tank regulator mounted at the inlet portion of the first hydrogen tank is controlled to be closed and the solenoid valve mounted at the inlet portion of each of the second to Nth hydrogen tanks is controlled to be opened when the hydrogen in the second to Nth hydrogen tanks needs to be transferred and filled in the first hydrogen tank.

* * * * *